United States Patent
Finn

(10) Patent No.: US 7,632,113 B2
(45) Date of Patent: Dec. 15, 2009

(54) RETRACTABLE USB STICK

(75) Inventor: David Finn, Tourmakeady (IE)

(73) Assignee: DPD Patent Trust Ltd., Lower Churchfield, Tourmakeady, Mayo County (IE)

( * ) Notice: Subject to any disclaimer, the term of this patent is extended or adjusted under 35 U.S.C. 154(b) by 806 days.

(21) Appl. No.: 11/295,685

(22) Filed: Dec. 6, 2005

(65) Prior Publication Data

US 2006/0131431 A1    Jun. 22, 2006

Related U.S. Application Data

(63) Continuation-in-part of application No. 10/990,296, filed on Nov. 16, 2004, now Pat. No. 7,213,766.

(60) Provisional application No. 60/663,541, filed on Dec. 6, 2004, provisional application No. 60/602,595, filed on Aug. 18, 2004, provisional application No. 60/562,204, filed on Apr. 14, 2004, provisional application No. 60/520,698, filed on Nov. 17, 2003, provisional application No. 60/664,974, filed on Mar. 24, 2005, provisional application No. 60/660,398, filed on Mar. 10, 2005, provisional application No. 60/652,895, filed on Feb. 15, 2005.

(51) Int. Cl.
    *H01R 13/44*    (2006.01)

(52) U.S. Cl. .......................................... 439/131

(58) Field of Classification Search .................. 439/131
    See application file for complete search history.

(56) References Cited

U.S. PATENT DOCUMENTS

| | | | |
|---|---|---|---|
| 3,941,489 A | | 3/1976 | Bryan |
| 5,496,186 A | * | 3/1996 | Dobbelaere et al. ............ 439/79 |
| 6,045,377 A | * | 4/2000 | Kajiura ........................ 439/159 |
| 6,411,505 B1 | * | 6/2002 | DiFonzo et al. ......... 361/679.38 |
| 6,456,500 B1 | * | 9/2002 | Chen ........................... 361/752 |
| 6,676,419 B1 | * | 1/2004 | Lin et al. .................... 439/76.1 |
| 6,743,030 B2 | * | 6/2004 | Lin et al. ..................... 439/131 |
| 6,808,400 B2 | * | 10/2004 | Tu ............................... 439/131 |
| 2005/0109841 A1 | | 5/2005 | Ryan |

* cited by examiner

*Primary Examiner*—Tho D Ta
(74) *Attorney, Agent, or Firm*—Gerald E. Linden; Dwight A Stauffer

(57) ABSTRACT

A retractable USB stick comprises: an elongate housing having an open end, a USB stick disposed within the elongate housing, and means for causing the USB stick to project out of and retract back into the housing. The means for causing the USB stick to project may be patterned after comparable means in a lipstick dispenser mechanism of U.S. Pat. No. 3,941,489. The means for causing the USB stick to project/retract may comprise an outer holder having an elongate housing with an opening at one end, an intermediate sleeve sized disposed between the USB stick and the holder, and means for imparting reverse motion includes a toothed wheel disposed at a back end of the intermediate sleeve, teeth on an inner surface of the outer holder and teeth on an elongate linear track extending from the back end of the USB stick. Optionally, the USB stick may be releasably locked in the open position, and means may be provided for closing the open end of the housing.

20 Claims, 4 Drawing Sheets

(Closed)

(Opening)

(Open)

(Locking Mechanism)

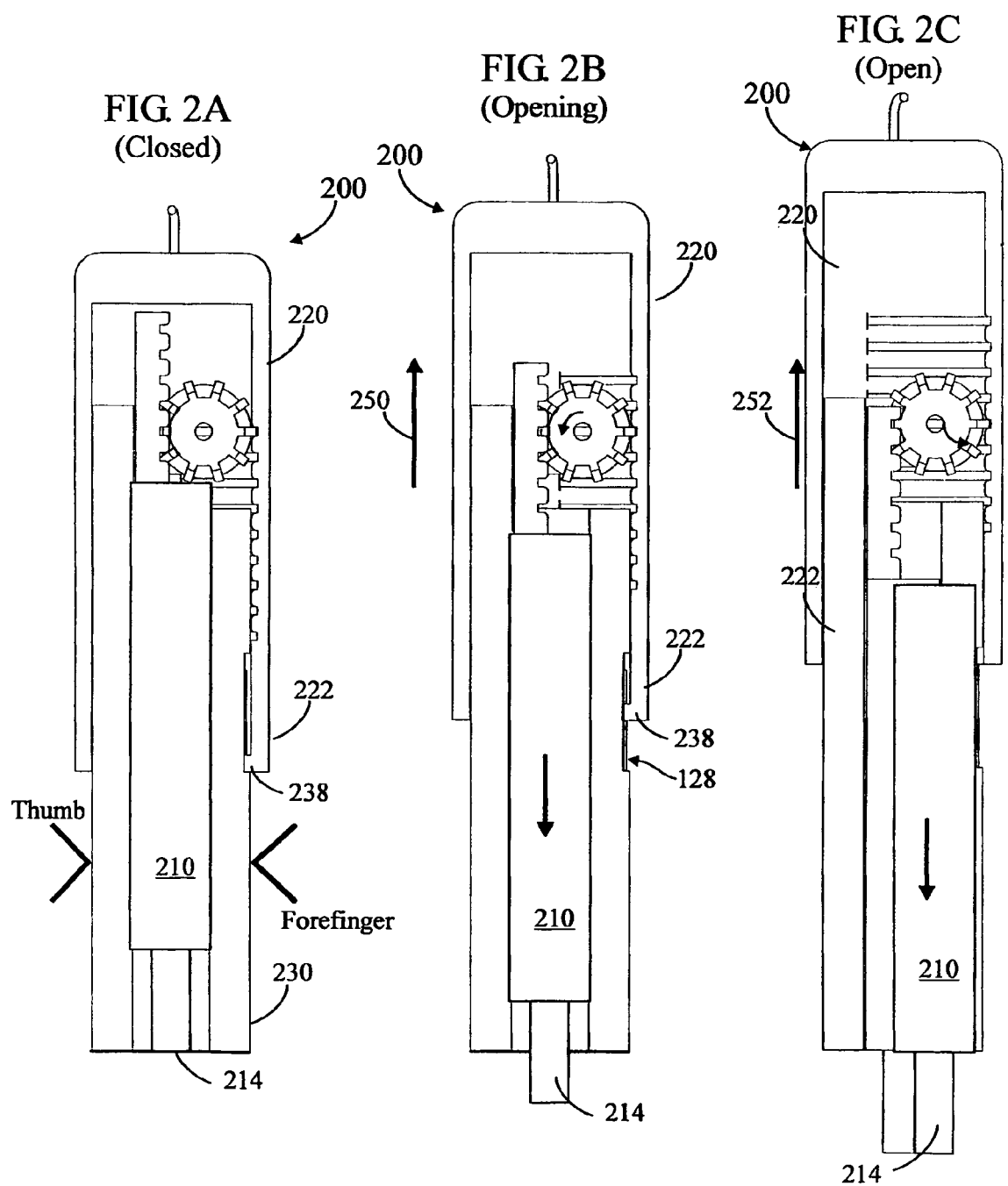

(Closed)

(Opening)

(Open)

RETRACTABLE USB STICK

CROSS-REFERENCE TO RELATED APPLICATIONS

This is a non-provisional filing of Provisional Application No. 60/633,541 filed Dec. 6, 2004.

This is a continuation-in-part of patent application Ser. No. 10/990,296 filed Nov. 16, 2004, now U.S. Pat. No. 7,213,766, which claims priority of:

Provisional Application No. 60/602,595 filed Aug. 18, 2004
Provisional Application No. 60/562,204 filed Apr. 14, 2004
Provisional Application No. 60/520,698 filed Nov. 17, 2003

This application claims priority of:

Provisional Application No. 60/664,974 filed Mar. 24, 2005
Provisional Application No. 60/660,398 filed Mar. 10, 2005
Provisional Application No. 60/652,895 filed Feb. 15, 2005

TECHNICAL FIELD OF THE INVENTION

The invention relates to USB memory sticks.

BACKGROUND OF THE INVENTION

Reference is made to commonly-owned, co-pending, non-provisional patent application Ser. No. 10/990,296 ('296 application) filed Nov. 16, 2004 (status, pending), incorporated in its entirety by reference herein.

The '296 application discloses a compact personal token apparatus, suitably resembling a conventional USB memory fob in size, shape, and form which can be plugged into a PC and interfaced with the virtual world of the Internet. The apparatus is capable of loading and storing information from the Internet, via the PC to its flash memory or EEPROM and then using the stored information or value via its wireless interface in the real world. The apparatus is capable of implementing an auto-run application, when inserted into a personal computer. The apparatus is capable of exchanging information with other devices having compatible interfaces. The apparatus can also function as a firewall when plugged between an Internet connection and a PC.

Apart from using USB tokens for file storage, they are also used for desktop settings, screen lock, network login & access control, log book, user authentication (storing digital signatures, certificates, key sets, finger-based biometric templates, usernames and passwords), digital content and transaction security as well as enterprise and Internet security.

A USB token can also be used to download emails, remotely access a PC or to open a customized browser that allows the user to surf the Web with total privacy.

Recent developments in USB flash memory drives have resulted in CDROM-like auto-run devices that automatically execute a file when the USB token is inserted into a PC. The read-only and auto-run contents are installed during the manufacturing process. Examples of auto-run contents include opening a website, running a demo application, showing a presentation, making a product pitch, providing customers with discount coupons etc.

Firewall A system designed to prevent unauthorized access to or from a private network. Firewalls can be implemented in both hardware and software, or a combination of both. Firewalls are frequently used to prevent unauthorized Internet users from accessing private networks connected to the Internet, especially intranets. All messages entering or leaving the intranet pass through the firewall, which examines each message and blocks those that do not meet the specified security criteria. There are several types of firewall techniques:

Packet filter: Looks at each packet entering or leaving the network and accepts or rejects it based on user-defined rules. Packet filtering is fairly effective and transparent to users, but it is difficult to configure. In addition, it is susceptible to IP spoofing.

Application gateway: Applies security mechanisms to specific applications, such as FTP and Telnet servers. This is very effective, but can impose a performance degradation.

Circuit-level gateway: Applies security mechanisms when a TCP or UDP connection is established. Once the connection has been made, packets can flow between the hosts without further checking.

Proxy server: Intercepts all messages entering and leaving the network. The proxy server effectively hides the true network addresses.

In practice, many firewalls use two or more of these techniques in concert. A firewall is considered a first line of defense in protecting private information. For greater security, data can be encrypted.

Flash Memory A special type of EEPROM that can be erased and reprogrammed in blocks instead of one byte at a time. Many modern PCs have their BIOS stored on a flash memory chip so that it can easily be updated if necessary. Such a BIOS is sometimes called a flash BIOS. Flash memory is also popular in modems because it enables the modem manufacturer to support new protocols as they become standardized.

RJ-45 Short for "Registered Jack-45". RJ-45 is an eight-wire connector used commonly to connect computers onto a local-area networks (LAN), especially Ethernets. RJ-45 connectors look similar to the ubiquitous RJ-11 connectors used for connecting telephone equipment, but they are somewhat wider.

SIM Short for "Secure Identity Module" or "Subscriber Identification/Identity Module". A SIM card inscribed with a customer's information and designed to be inserted into any mobile telephone. Usually SIM card phones work by GSM technology. The SIM card contains a user's GSM mobile account information. SIM cards are portable between GSM devices—the user's mobile subscriber information moves to whatever device houses the SIM.

USB Short for "Universal Serial Bus". USB is a serial bus standard (standardized communications protocol) that enables data exchange between electronic devices. USB supports data transfer rates of up to 12 Mbps (megabits per second). A single USB port can be used to connect up to 127 peripheral devices, such as mice, modems, and keyboards. USB also supports plug-and-play installation and "hot plugging". USB is expected to completely replace serial and parallel ports. Hi-Speed USB (USB 2.0) similar to FireWire technology, supports data rates up to 480 Mbps.

A USB flash memory drive is a portable storage device, which functions like a hard drive or a removable drive when inserted into the USB port of a PC. Primarily used to store, backup, download and transfer data from one computer to another. These USB key chain memory devices have replaced floppy disk drives in the market.

A USB Token is a portable, hand-held key fob that is the size of a standard car key. It is embedded with a computer microchip that can store, access and process data.

USB tokens have an operating system, temporary memory and non-volatile, "updateable" file/object storage memory, affording capabilities greater than those of traditional smart cards. They can generate secret cryptographic keys (Public & Private Key Infrastructure) and store private data (digital certificates, digital signatures, biometric identifiers, passwords, system settings etc).

U.S. Pat. No. 3,941,489 ("lipstick dispenser") discloses a dispensing holder for cosmetic stick product and the like, comprising an outer casing which is completely cylindrical and has an opening at one end. A circular rim surrounds the opening and has an annular shoulder at its underside. Co-operable with the shoulder is a thin, curved wafer-like closure member disposed in the casing and movable from a retracted position closely underlying the cylindrical casing wall to an advanced position wherein it spans the open end of the casing so as to engage the shoulder and form a tight, dust-proof seal therewith. The circular rim lies in a plane which is substantially perpendicular to the casing axis, such that the casing has the especially pleasing external appearance of a perfect cylinder. The closure member is carried by a flexible, push-pull actuator strap which is guided for movement along diametrically opposite longitudinal portions of the casing by a tubular internal guide member. A product-carrying cup is disposed in the guide member and is movable between advanced and retracted positions respectively, as the closure member is moved between its retracted and advanced positions. A finger piece extends through a longitudinal slot in the casing and is connected to the strap. The closure member is thin and yieldable such that in its retracted position it has a curved cross-sectional configuration which enables it to nest immediately inside the cylindrical casing wall. As the closure member is moved toward its advanced position, it undergoes tilting movement and at the same time flattens somewhat such that when it spans the open end of the casing it has a substantially planar configuration and sealingly engages the circular rim shoulder.

BRIEF DESCRIPTION (SUMMARY) OF THE INVENTION

As used herein, a "USB stick" is any small, self-contained memory apparatus, for example approximately ½-1 inch in cross-section and approximately 2-3 inches in length, having a USB plug for plugging into the USB port of a computer (or other apparatus capable of interacting with the USB stick).

The invention is generally a USB stick mounted in a dispensing holder. Various embodiments of dispensing holders are disclosed herein.

According to the invention, a retractable (also "retractible") USB stick comprises: an elongate housing having an open end; a USB stick disposed within the elongate housing; and means for causing the USB stick to project at least partially, out of the open end of the housing in an open position. The USB stick may project substantially fully out of the housing. The USB stick should project sufficiently out of the housing so that a USB connector at an end of the USB stick is adequately exposed for plugging into a personal computer. An antenna may be incorporated. Means may be provided for releasably locking the USB stick in the open position. Means may be provided for closing the open end of the housing. The means for causing the USB stick to project may be patterned after comparable means in a lipstick dispenser mechanism of U.S. Pat. No. 3,941,489. The means for causing the USB stick to project at least partially out of the open end of the housing may comprise: an outer holder comprising an elongate housing with an opening at one end; an intermediate sleeve sized disposed between the USB stick and the holder; and means for imparting reverse motion such that moving the outer housing relative to the intermediate sleeve causes the USB stick to extend from and retract into the intermediate sleeve.

The means for imparting reverse motion may comprise: a toothed wheel disposed at a back end of the intermediate sleeve; teeth on an inner surface of the outer holder; and teeth on an elongate linear track extending from the back end of the USB stick In another embodiment, retractable USB apparatus comprises: an inner USB stick; an outer holder comprising an elongate housing with an opening at one end; and an intermediate support comprising two parallel arms extending from the housing and pivotally supporting the SSB stick. The apparatus may comprise an ink cartridge having a tip extending out an opposite end of housing.

A method of using a USB stick, comprises: providing a housing for the USB stick; disposing the USB stick within the housing; and providing a mechanism whereby a user can cause the USB stick to be deployed from within the housing to at least partially out of an open end of the housing in an open position. Optionally, means may be provided for releasably locking the USB stick in the open position, and means may be provided for closing the open end of the housing.

The USB connector may be a FireWire or other comparable, suitable connector.

Other objects, features and advantages of the invention will become apparent in light of the following description thereof.

BRIEF DESCRIPTION OF THE DRAWINGS

Reference will be made in detail to preferred embodiments of the invention, examples of which may be illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the figures may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1A:
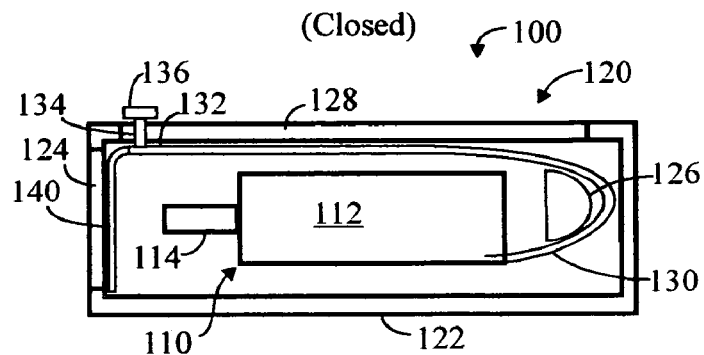

Elements of the figures are typically numbered as follows. The most significant digits (hundreds) of the reference number correspond to the figure number. For example, elements of FIG. 1 are typically numbered in the range of 100-199, and elements of FIG. 2 are typically numbered in the range of 200-299. Similar elements throughout the figures may be referred to by similar reference numerals. For example, the element 199 in FIG. 1 may be similar (and possibly identical) to the element 299 in FIG. 2. Throughout the figures, each of a plurality of elements 199 may be referred to individually as 199*a*, 199*b*, 199*c*, etc. Such relationships, if any, between similar elements in the same or different figures will become apparent throughout the specification, including, if applicable, in the claims and abstract.

The structure, operation, and advantages of the present preferred embodiment of the invention will become further apparent upon consideration of the following description taken in conjunction with the accompanying figures (FIGs).

Figure 2:
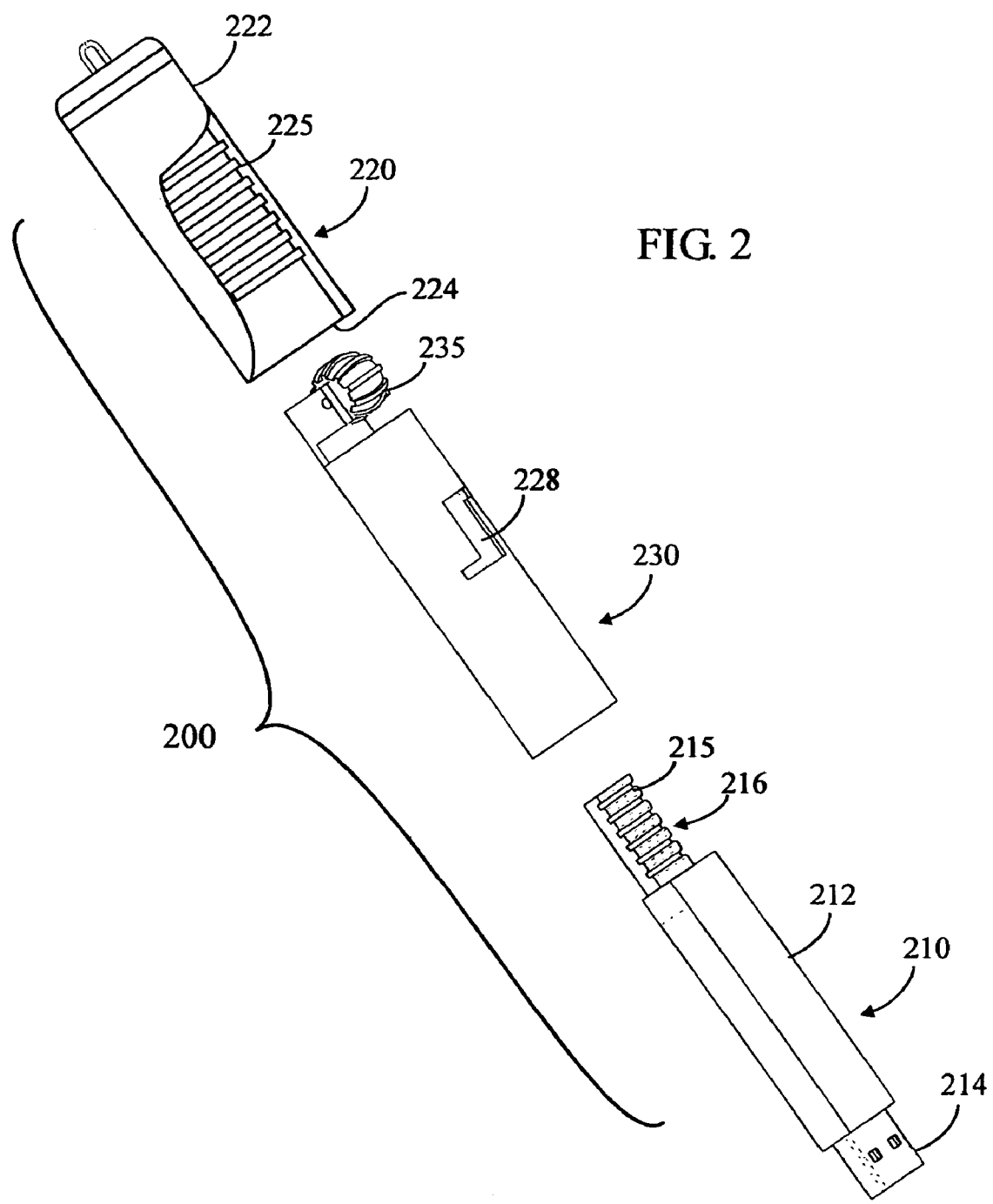

FIG. 1A is a stylized side cross-sectional view of an embodiment of a USB stick mounted in a dispensing holder, in a closed position, according to the invention.

Figure 1B:
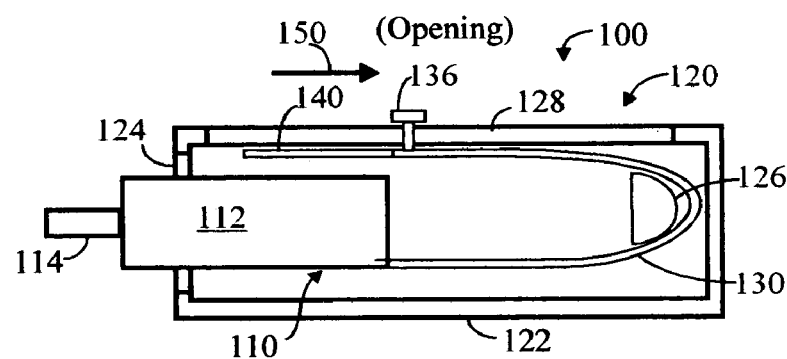

FIG. 1B is a stylized side cross-sectional view of an embodiment of the USB stick mounted in a dispensing holder of FIG. 1A, in an opening position, according to the invention.

Figure 1C:
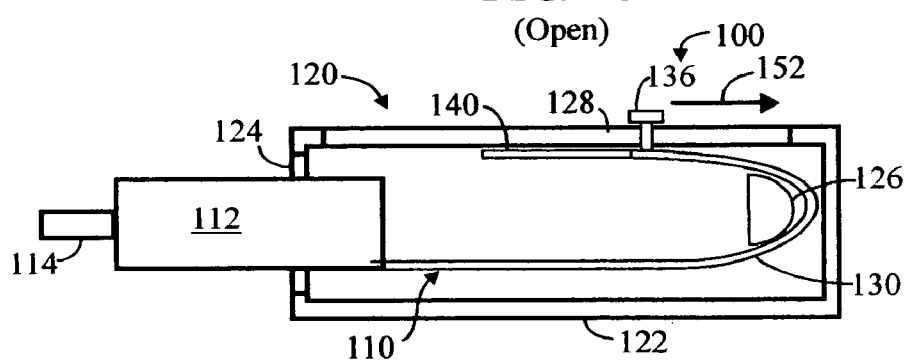

FIG. 1C is a stylized side cross-sectional view of an embodiment of the USB stick mounted in a dispensing holder of FIG. 1A, in an open position, according to the invention.

Figure 1D:
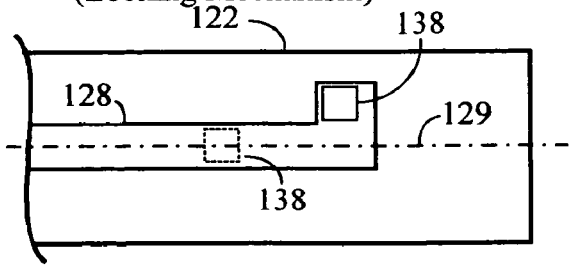

FIG. 1D is a top plan view of a portion of an outer housing of the dispensing holder of FIG. 1A in the closed position, according to the invention.

FIG. 2 is an exploded perspective view (partially broken-away) of an embodiment of the invention.

FIG. 2A is a side cross-sectional view of the FIG. 2 embodiment of the invention, in a closed position.

FIG. 2B is a side cross-sectional view of the FIG. 2 embodiment of the invention, in a partially open (opening) position.

FIG. 2C is a side cross-sectional view of the FIG. 2 embodiment of the invention, in an open position.

Figure 3:
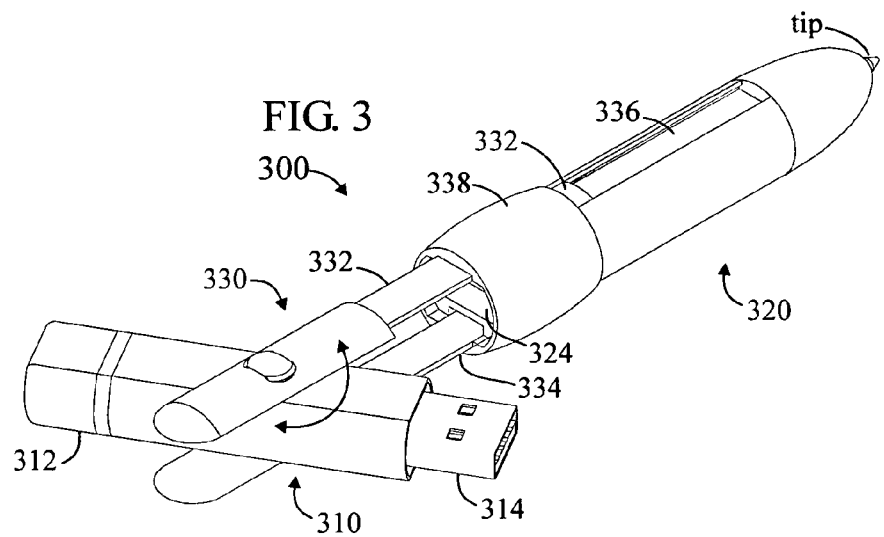

FIG. 3 is a perspective view of an embodiment of the invention.

Figure 3A:
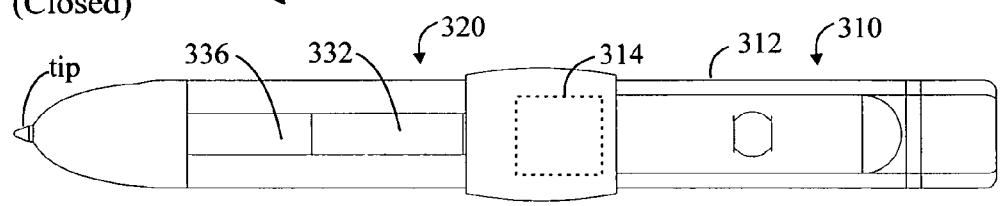

FIG. 3A is a side cross-sectional view of the FIG. 3 embodiment of the invention, in a closed position.

Figure 3B:
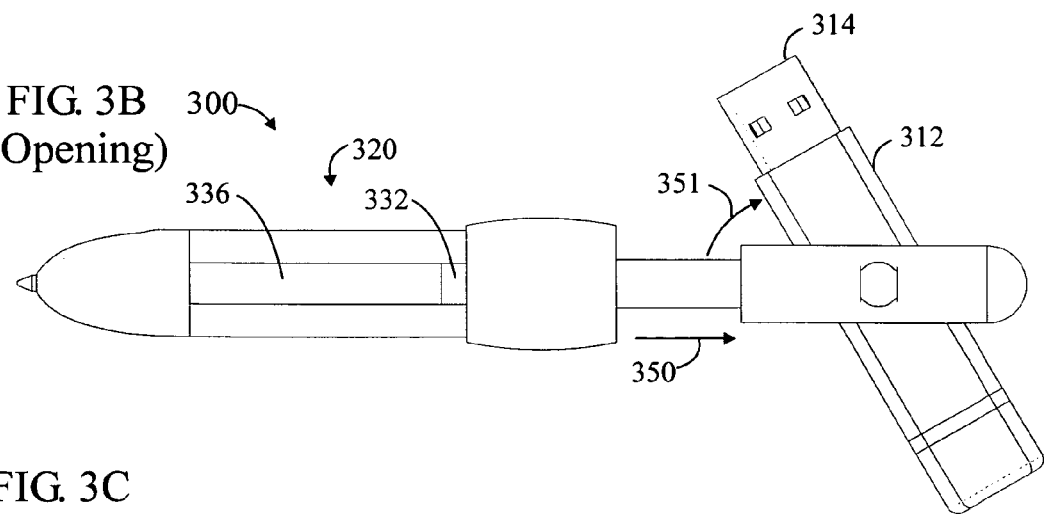

FIG. 3B is a side cross-sectional view of the FIG. 3 embodiment of the invention, in a partially open (opening) position.

Figure 3C:
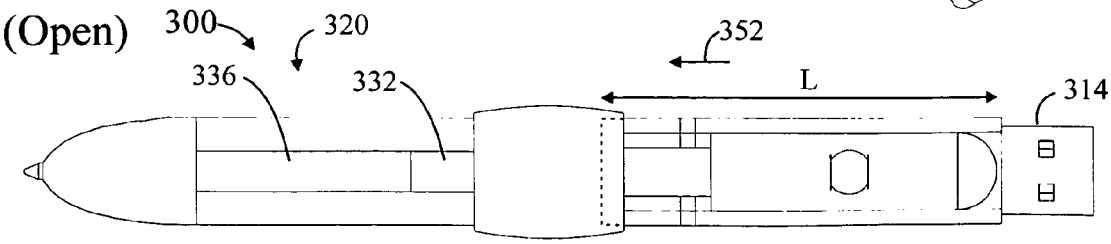

FIG. 3C is a side cross-sectional view of the FIG. 3 embodiment of the invention, in an open position.

DETAILED DESCRIPTION OF THE INVENTION

In one embodiment, the invention is generally a USB stick mounted in a dispensing holder similar to the above-reference dispensing holder (U.S. Pat. No. 3,941,489) for cosmetic stick product and the like.

In a most general sense, the holder simply contains a USB stick rather than a cosmetic product. Similar to the dispensing holder for cosmetic stick product and the like, a finger piece extends through a longitudinal slot in the casing and is connected to a strap.

When the finger piece is moved in the reverse direction towards the retracted position (towards the back of the holder), the strap retracts, the closure member moves to expose (uncover) the opening in the front end of the casing (holder), and the product carrying cup (or the like) advances, thereby causing a front portion of the USB stick to move forward and advance through the opening in the front end of the holder.

When the finger piece is moved in the forward direction towards the advanced position (towards the front of the holder), the strap advances and the product carrying cup (or the like) retracts, thereby causing a front portion of the USB stick to move backwards and retract through the opening in the front end of the holder, and the closure member moves (advances) to close off the opening in the front end of the casing (holder).

This relationship between reverse motion of the finger piece and forward motion of the USB stick, and the relationship between forward motion of the finger piece and reverse motion of the USB stick is what is referred to as "reverse motion" herein.

The present invention is not, however, a simple substitution of a USB stick for the cosmetic stick product, although it is believed to be non-obvious to incorporate a USB stick in the holder. Differences include, but are not limited to:

Functionality

The USB stick can be a simple memory stick. Or, it can incorporate several of the features and functions of the compact personal token apparatus which is set forth in the aforementioned '296 application. The invention described therein is generally a compact personal token apparatus which can be plugged into a personal computer (PC) and interfaced with the virtual world of the Internet. The apparatus can then be removed from the PC and used to conduct real world transactions. The compact personal token apparatus is suitably in the general form of a fob, resembling a USB memory fob. The compact personal token apparatus comprises a wireless interface. The "compact personal token apparatus" is also referred to therein as "smart fob" (without prejudice to any trademark rights which may be claimed).

The apparatus may incorporate firewall functionality to protect an Internet-capable appliance. The apparatus may comprise interfaces for ISO contact, contactless, USB and DSL. The apparatus may comprise an LCD screen. The apparatus may comprise at least one switch. The apparatus may comprise at least one LED.

The apparatus may further comprise a standard-compliant contactless/wireless interface; the contactless/wireless interface complying with one or more of the following standard interfaces: RFID-contactless interface according to ISO 14443 and ISO 15693 as well as similar wireless interfaces Bluetooth compatible interface, WLAN 812.11, UWB, and any similar interface.

The '296 application described that the USB device is capable of implementing an auto-run application, when inserted into a personal computer (PC) connected to the Internet, and information exchanged and stored can be accessed in the real world application via its wireless interface. The memory space required for the auto-run application can reside completely in the device or only partially in the device. Additional memory space to complete the application can be located on the server of the ISP, trusted third party or host server. The apparatus is also capable of exchanging information with other devices having compatible interfaces.

Application software for auto-run can reside partially in the USB stick and partially at the trusted server or even at the host server. With respect to cryptography, the requisite "identity based encryption" for user authentication can also reside partially in the USB key and partially at the trusted server, in order to speed up the processing time.

Form Factor

The USB stick can be in the form of a commercially-available USB memory stick, complete with its own housing, except that these memory sticks usually come with a removable cover which protects the USB connector at the front end of the stick. The cover is not required, because the dispensing holder of the present invention comprises a housing (casing) which protects the USB connector when the USB stick is retracted, and not in use.

Alternatively, the USB stick can be a "stripped down" version of a commercially-available USB memory stick, without its own housing, having just the electronics and minimal mechanical features to support the electronics.

Locking Feature

The lipstick dispenser is quite clever in its own right. Patented in 1976, such products are now commercially available, such as in the form of lip balm. (cf. Labello® Lippenpflege). When the finger piece is in the retracted position, the cosmetic product extends out of the opening in the front end of the casing. But, it is not locked in position. (It is also worth noting that the Labello product is not perfectly cylindrical. Rather, the casing has one flat side where the longitudinal slot and the finger piece are located.)

When the user exerts pressure on the cosmetic product (such as by pressing hard against their lips), the cosmetic product will move backwards, back into the casing. This happens without the user moving the finger piece in the forward direction. As a matter of fact, the backwards motion of the cosmetic product causes towards the forward motion of the finger piece.

In the context of the present invention, when the USB stick is extended out of the casing, it is intended to be inserted into the USB port of a personal computer (or the like). The insertion force is non trivial (in some cases, quite significant) and would certainly be enough to cause the USB stick to retract—a highly undesirable situation.

The present invention is provided with a locking mechanism which releasably locks the USB stick in its fully extended position so that it can be inserted in the USB port of a personal computer (or the like) without retraction, and which requires a threshold force and/or a special motion to unlock the USB stick so that it can be retracted by moving the finger piece in the forward direction towards the advanced position.

For example, the locking mechanism can comprise detents, notches, pawls, grooves, teeth, and the like, and require that a motion of the finger piece other than the normal longitudinal (to the casing) reverse motion used extend/retract the USB stick is required to retract the USB stick.

For example, a slight sideward (tangential to the casing) motion. Or, depressing the finger piece (radial to the casing). For resilience, a separate spring can be used. Or, the resiliency of a plastic member (functioning in the elastic deformation regime). The idea is that the USB stick is locked into position when it is fully extended from the casing, and should not inadvertently be retracted.

Antenna

As described hereinabove, the compact personal token apparatus (or "smart fob") comprises a contactless and/or wireless interface. This requires an antenna. USB fobs do not normally come with their own antennas. A suitable length for an antenna for a smart fob incorporating smart card functionality is 1-10 cm. An antenna of significant length is desired. The housing may interfere with the performance of the antenna.

The present invention includes an antenna of significant length, such as approximately 5 cm, which is separate from the USB stick, but which is electrically connected to the electronic circuitry within the USB stick. (Alternatively, transformer coupling of the antenna to the circuitry of the USB stick is also possible.)

Recall that in the lipstick dispenser, the finger piece extends through a longitudinal slot in the casing and is connected to the strap.

According to the invention, to overcome shielding effects of the housing, the antenna is incorporated into the strap. The longitudinal slot in the casing provides adequate "leakage" for the antenna to function properly (propagate and receive signals).

The housing could be of metal or metallized plastic which attenuates the radio frequency signal. Wireless LAN operates at an ultra high frequency of around 950 MHz which requires a strip of wire as an antenna which could be integrated into the plastic finger piece. RFID operates at the high frequency of 13.56 MHz which means that an antenna with a few turns would need to be incorporated into the finger piece. The antenna wire could be ultrasonically embedded into the finger piece.

Of course, if the housing is plastic the antenna for both frequencies can be etched onto the perimeter rim of the PCB board in the USB stick. At ultra high frequency, again a very short metal track (strip) of about 5 cm is required. For the high frequency antenna, the track goes around the PCB board several times (about 4 times).

Interfaces

As is known, RFID (i.e. contactless) operates at 13.56 MHz, and Wireless (i.e. WLAN 802.11a/b/g) operates at 2.4 & 5.0 GHz. They are different, but they are both "wireless" in the broad sense of the term. RFID operates at a maximum distance of 1 meter for pure identification and in a payment application, the distance is restricted to 10 cm.

The apparatus disclosed in patent application Ser. No. 10/990,296 ('296 application) filed Nov. 16, 2004 can communicate either with the RFID—contactless interface or with the Wireless Interface. The apparatus is constructed to have both. In a derivation of the apparatus, the apparatus also includes Bluetooth (for private area network) which operates at the same frequency as WLAN 802.11 b/g, but in fact is an additional interface.

In summary, the RFID contactless interfaces are ISO 14443, 15693 and NFC, the wireless interfaces are WLAN, Bluetooth and UWB and the mechanical interface is for example USB. The present invention has these interfaces. Additionally, the present invention has a shared memory between the interfaces which can be EEPROM or NAND Flash Memory. The Smart Card interface is an internal configuration where the device of the invention translates USB to Smart card protocol.

Waterproof Front Closure

In the lipstick dispenser, the closure member forms a dust-proof seal with the cylindrical casing.

It would generally be desirable that the front closure is waterproof, or at least water-resistant. This is, of course, dependent on how well (snugly) the closure member fits across the opening in the front end of the housing, and the resiliency of the materials which are used.

The invention incorporates means for closing the end of the casing (housing) through which the USB stick extends.

Hatch for a SIM Card

According to the invention, additional functionality may be incorporated into the USB stick by providing the housing with a hatch for inserting a SIM card. Connections to the circuitry within the USB stick can be made via the strap. The hatch would be located in the casing (housing).

Telephone/DSL Interface

The apparatus may incorporate firewall functionality to protect an Internet-capable appliance.

FIG. 4 of the '296 application is a schematic block diagram of an exemplary embodiment 400 of the invention wherein the device can be used as a firewall to protect, for example, a PC. The functionality is described elsewhere in greater detail. The principal components of the device 400 are:

- a connection module 402 for plugging into the USB (or, network, LAN/Ethernet, or Fast Ethernet 10/100 MBit) port of a PC;
- a processor module 406; and
- an input module 408 which, unlike other embodiments, need not perform wireless functions, but rather is socket (or plug), such as RJ-45, for connecting to a telephone line (or the like) supporting a DSL (or the like) connection to the Internet.

The device 400 may also incorporate flash memory 510 (compare 150).

FIG. 5 of the '296 application is a schematic block diagram of an exemplary embodiment 500 of the invention, based on the embodiment 100 of FIG. 1. The major components are:
- a connection module 502;
- a translation module 504;
- a processor module 506;
- an input/output (I/O) module 508; and
- an LCD display 510 for displaying messages regarding status or other relevant information to the user. It will be understood that a device having an LCD display should be "active", having its own battery (not shown).

Other input and output devices, such as switches 512 and LEDs (light-emitting diodes) 514, could readily be added to the device.

According to the invention, the retractable USB stick can be plugged into a PC (or the like), between the telephone line (DSL connection to the Internet) and the PC, to act as a firewall. The front end of the USB stick can be provided with a RJ-45 connector rather than a USB connector, for plugging directly into the LAN (Ethernet) port on the PC. And, the back end of the housing for the USB stick can be provided with another RJ-45 connector so that the phone line can be plugged into the housing for the USB stick rather than into the PC.

Alternatively, the plugs at both ends of the USB stick (one on the stick per se, the other on the housing) can be RJ-11, for performing a firewall function for a regular analog telephone line. With two RJ-11 plugs, the USB stick can be interposed between any phone line and any phone apparatus, for any desired purpose. For example, functioning as an answering machine. Or, recording and/or transmitting telephone conversations (where it is legal to do so).

In either case, the plug at the back end of the housing for the USB stick should also be protected from the environment.

Retractibility

Many of the features described herein, do not "require" the retractibility (reverse motion) feature of the present invention, but the reverse motion feature certainly does give the product some appeal. In short, it is quite a cool gadget.

An alternative to the reverse motion dispensing holder would be, for example, a conventional "twist & turn" lipstick-type dispenser. However, such dispensers typically have a cap that must be removed before twisting to expose the contents of the dispenser (typically lip balm or lipstick). One of the advantages of the reverse motion embodiment of the invention is that a separate cap is not required.

Alternatively, some ball point pens have interesting mechanisms requiring, for example, turning to cause the ink cartridge to project from the housing. And, most ball point pens incorporate some sort of locking mechanism to prevent the ink cartridge from being pushed back into the housing simply by pressure, such as the normal pressure of writing. It is contemplated that a comparable locking mechanism can be incorporated into the retractable USB stick of the present invention.

Embodiment 1

This embodiment is based on the above-referenced above-reference dispensing holder (U.S. Pat. No. 3,941,489) for cosmetic stick product and the like.

FIGS. 1A, 1B, 1C and 1D illustrate an embodiment 100 of a USB stick 110 in a dispensing holder 120 in three positions—Closed, Opening, and Open, respectively.

The USB stick 110 comprises an elongate main body 112 and a USB connector 114 at its front end (left, as shown) of the main body 112.

The dispensing holder 120 comprises an elongate housing 122, with an opening 124 at its front end (left, as shown) of the housing 122.

An elongate strap 130 extends from the back (right, as viewed) end of the main body 112, towards the back (right, as viewed) end of the housing 122, wraps around a fixed boss 126 disposed near the opposite end of the housing, then back towards the front end housing, passing alongside of the USB stick 110, to the front end of the housing 122.

In the closed position (FIG. 1A), the far end 132 of the elongate strap 130 is disposed adjacent the front end of the housing 122. A finger piece 134 extends from the far end 132 of the strap 130 through an elongate slot 128 in the housing 122 terminates in a button 136 which is external of the housing 122. (There is a post 138 between the strap 130 and the button 136.)

In the closed position (FIG. 1A), the USB stick 110 is completely enclosed within the housing 120, except that the housing has an opening 124 in its front end.

A flap 140 extends from the far end 132 of the strap 130 across the opening 124 to completely cover the opening 124. The flap 140 is suitably formed of plastic, and is sized and shaped to cover (close) the opening 124 in the front (open) end of the housing 122 in the closed position (FIG. 1A).

Alternatively, the means for closing the opening 124 could simply be (for example) two resilient flaps fixed to opposite sides of the opening and facing (and partially overlapping) each other, like saloon doors, which would deflect when the USB stick is extended out of the housing and which would return to position when the USB stick is retracted to within the housing.

The strap 130 is suitably a flexible plastic strap, and may have an antenna element (wire) embedded therein, as described hereinabove, which is connected with electronics inside the USB stick 110. This is illustrated in the figure by one of the lines of the strap extending into the main body of the USB stick.

FIG. 1B shows the apparatus 100 in a partially open ("Opening") position. Here, the user has slid the button 136 rearwards, as indicated by the arrow 150, towards the back (right as shown) end of the housing 122. The strap 130 urges the USB stick 110 forward. The opening 124 is revealed (uncovered) as the flap 140 "follows" the strap 130. The USB stick 110 is disposed through the opening 124, and is now partially external of the housing 122. The connector 114 has emerged from the housing 122.

FIG. 1C shows the apparatus 100 in the open ("Open") position. Here, the user has slid the button 136 further rearwards, as indicated by the arrow 152, towards the back (right as shown) end of the housing 122. The strap 130 urges the USB stick 110 more forward. The opening 124 has already been revealed (uncovered), and the flap 140 continues to follows the strap 130. The USB stick 110 is disposed through the opening 124, and is now substantially fully exposed external of the housing 122, and is now ready to be plugged into the USB port of a host device (such as personal computer).

The post 138, the button 136, the strap 130 and the elongate slot 128 in the housing 122 may be considered means (or mechanism) for causing the USB stick to project at least partially (in this embodiment, substantially fully) out of the open end of the housing 122.

As mentioned above, when the USB stick is extended out of the casing (housing), it is intended to be inserted into the USB port of a personal computer (or the like). The insertion force is non trivial (in some cases, quite significant) and would certainly be enough to cause the USB stick to retract—a highly undesirable situation. As mentioned above, a locking mechanism which releasably locks the USB stick in its fully extended position can comprise detents, notches, pawls, grooves, teeth, and the like, and require that a motion of the finger piece other than the normal longitudinal (to the casing) reverse motion used extend/retract the USB stick is required to retract the USB stick.

FIG. 1D illustrates a suitable locking mechanism, and shows a top surface of the housing 122 and the elongate slot 128 in the housing, and the post 138 (shown and described hereinabove, but not labeled) which supports the button (136 not shown in this figure). This figure is showing the back end of the housing 122, with the apparatus in its closed position.

The post 138 is shown, in dashed lines, in a previous, not quite "closed" position within the slot 128, and in solid lines in the closed position. In this figure, a longitudinal axis 129 is shown for the elongate slot, which generally follows the axis, except as described herein. At the end of the slot, the slot jogs to the side, forming a notch. When the post (of course, the button) is at the "closed" position, it is urged by any suitable means, off axis, into the notch. (This may include that the post is constantly in tension against the bottom (as viewed) edge of the slot and it pops into the notch because of its own resilience and a certain amount of play in the parts.) In this manner, when a force is exerted by the USB stick (such as when it is being plugged into a personal computer, as described above), the post 138 is restrained from moving forward (to the left, in the figure) by the notch. And, the user must tweak the button to the side (downward, as viewed in the figure) to get the post 138 out of the notch back into the axial portion of the slot 128. The idea being illustrated here is that the USB stick is locked into position when it is fully extended from the housing, and should not inadvertently be retracted.

Alternatively the notches can be on the external surface of the casing at the front and back, whereby the button latches into position at either end and has to be unlocked with some thumb force. In another design, the button is released from its locked position by downward pressure on the button.

When the user wants to retract the USB stick back into the housing, he/she simply tweaks the button out of the notch and into the axial portion of the slot and pushes the button forward (to the left, as viewed) which, as we follow the sequence illustrated in FIGS. 1A-1C in reverse, causes the USB stick to retrace back into the housing and, finally, the flap 140 to close the opening 128.

The strap and the flap are constrained in their motion by the shape of the inside of the housing, and that (depending on individual designs), various guide features may be molded into the housing, for example to keep the flap flush against the opening when the apparatus is in the "closed" position (FIG. 1A). Also, that the housing would not be so square, but rather rounded off to facilitate motion, as well as for aesthetics. And, the front end of the housing could preferably be angled at something like sixty degrees rather than 90 degrees to facilitate the flap 140 "making the corner". These design features are considered to be well within the purview of one having ordinary skill in the art to which the present invention most nearly pertains. In other words, the drawings are not intended to be detailed blueprints (manufacturing drawings).

The embodiment described hereinabove (FIGS. 1A-1D) typifies various features and advantages of the invention, including but not limited to:

Whereas prior art USB sticks often have a separate cap to protect the USB connector when not in use (and which often gets lost), the present invention has a housing which completely enclosed the USB stick and does not get detached from the stick. Furthermore, referencing the antenna feature, the housing serves an important electronic function, it is not simply a dust cover.

The way that the strap 130 turns 180 degrees around the boss 126 makes it such that there is some kind of motion translation going on. In other words, if there were no strap 130, and the post 138 were to extend from the side of the USB stick, there would be no "reverse" motion. Rather, pushing the button in one direction (e.g., to the left) would result in the same motion (e.g., to the left) of the USB stick vis-à-vis the housing. In other words, in the present invention, there is some kind of translation of motion.

And, as mentioned above, the reverse motion feature certainly does give the product some appeal. In short, it is quite a cool gadget.

Additional embodiments incorporating some or all of the features of the previously-described embodiment, and possibly additional features, will now be described.

Embodiment 2

FIGS. 2, 2A, 2B and 2C illustrate another embodiment 200 of the invention, which incorporates a "reverse motion" feature as well as completely enclosing the USB stick in the "closed" position, using a different mechanism than was described in the previous embodiment. FIG. 2 is an exploded perspective view. FIGS. 2A, 2B and 2C are side cross-sectional views corresponding to FIGS. 1A, 1B and 1C in that they show the apparatus 200 in "closed", "opening" and "open" positions, respectively.

The apparatus 200 comprises three main components:
an inner USB stick 210 (compare USB stick 110);
an outer holder 220 (compare holder 120); and
an intermediate sleeve 230 (compare strap 130).

Referring to FIG. 2, the inner USB stick 210 comprises an elongate main body 212 (compare 112) and a USB connector 214 (compare 114) at its front end (bottom right, as shown) of the main body 212. A toothed, elongate, linear track 216 extends from the back (upper left, as viewed) end of the main body 212 of the USB stick 210, towards the back end (upper left, as viewed) of the holder 220.

The outer holder 220 comprises an elongate housing 222, with an opening 224 at its front end (bottom right, as viewed). The housing 222 is suitably in the form of a cylinder, open at one end. The back end (top left, as viewed) end of the housing 222 is closed, and is shown with an eyelet for dangling the apparatus 200 from a key ring (not shown).

The intermediate sleeve 230 is an essentially cylindrical element, open at both ends (except as described herein below), that fits between the USB stick 210 and the holder 220. In other words, the USB stick 210 fits inside of the intermediate sleeve 230, and the intermediate sleeve 230 fits inside of the holder 220. The intermediate sleeve 230 has a slot 228 (compare 128) which is primarily longitudinal, to allow longitudinal (axial) motion between the intermediate sleeve 230 and the outer holder 220, as described in greater detail herein below. As will be seen, in this embodiment "reverse motion" is imparted by telescoping the intermediate sleeve 230 relative to the outer housing 220, and this results in the USB stick 210 emerging from and retracting back into the housing 222. The slot 228 is Z-shaped, having a notches at both ends, for locking the apparatus in both the closed and open positions, as described in greater detail herein below.

The means for imparting reverse motion in the previous embodiment was the strap 130 going 180 degrees around the boss 126. In this embodiment, the means for imparting reverse motion comprises a toothed wheel 235 disposed at the back end of the intermediate sleeve 230, teeth 225 on the inner surface of the outer holder 220, and teeth 215 on the elongate linear track 216 extending from the back end of the USB stick 210. In use, moving the outer housing relative to the intermediate sleeve causes the USB stick to extend from and retract into the intermediate sleeve, as described in greater detail hereinbelow.

Referring now to the cross-sectional views of FIGS. 2A, 2B and 2C, it can be seen how the toothed wheel 235 translates motion between the outer housing 220 and the USB stick 210. First of all, in the closed position (FIG. 2A) the intermediate sleeve 230 projects from within the outer housing 220 to outside of the outer housing, so that it can be grasped by a user, as indicated by the big dark V arrowheads, such as between the thumb and forefinger of one hand. In these figures, illustrating the relative positions of things during opening, the intermediate sleeve 230 is shown as the point of reference (not moving, at the same vertical position on the page, in all three views).

In FIG. 2A, the apparatus 200 is "closed", and the USB stick 210 is fully retracted.

As shown in FIG. 2B, to open the apparatus, revealing the USB stick for use, while holding the intermediate sleeve 230 the user grasps the outer housing and pulls back on it (upwards, as viewed in FIG. 2B), as indicated by the arrow 250 (compare 150). The teeth 225 on the inner surface of the outer holder 220 engage and rotate the toothed wheel 235 counter clockwise, the toothed wheel 235 engages the teeth 215 on the elongate linear track 216 of the USB stick 210 moving it forward (downwards, as viewed in FIG. 2B). The connector 214 has begun to emerge from the housing 222.

As shown in FIG. 2C, further pulling back on the outer housing, as indicated by the arrow 252 (compare 152), results in further turning of the toothed wheel 235 and further forward movement of the USB stick 210. The connector 214 has fully emerged from the housing 222, sufficiently to be plugged into a personal computer (or the like).

To retract the USB stick back into the housing, the opposite motions are performed.

A difference between this embodiment and the previous one is that whereas the end of the housing 122 was closed by a flap 140 when the apparatus 100 was in the closed position, in this embodiment the end of the housing 222 is not closed when the apparatus 200 is in a closed position.

A similarity between the two embodiments is that they both involve some kind of reverse motion, and also that in the closed position, the USB stick is completely within the housing.

The toothed wheel 235, teeth 225 on the inner surface of the outer holder 220, and teeth 215 on the elongate linear track 216 of the USB stick 210 may be considered means (or mechanism) for causing the USB stick to project at least partially out of the open end of the housing 222. In this embodiment, the USB stick 210 projects only slightly out of the housing 222, but sufficiently that the USB connector 214 is adequately exposed for plugging into a personal computer (or the like).

The two embodiments are similar in that they both have means (mechanism) for releasably locking the USB stick in its extended (open) position so that the apparatus does not collapse when plugging the USB connector into a port on a personal computer (or the like).

In this embodiment, the locking mechanism includes the slot 228 in the intermediate sleeve 230 and a nub 238 (compare 128) on the intermediate sleeve 230. The slot 228 is primarily longitudinal, to allow for longitudinal (axial) motion between the intermediate sleeve 230 and the outer holder 220. As shown in the figures, at the open end of the outer holder 220, at a position on the outer holder 220 corresponding to the slot 228, there is the nub 238 which extends radially inward into the slot 228. Whereas the slot 128 was essentially L-shaped, having a notch extending off-axis (circumferentially shifted on the housing 122), the slot 228 is Z-shaped, having two notches extending off-axis (circumferentially shifted on the housing 222) so that by twisting the outer housing 220 with respect to the intermediate sleeve 230 the housing and sleeve (hence the USB stick) can be locked in position in both of the open and closed positions.

Irrespective of the reverse motion, one "cool" thing about the invention (i.e., the method of the invention, which is how the user uses/deploys the USB stick) is that the user moves one thing with respect to another, and the result is that the USB stick emerges from being completely hidden. This type of mechanical feature captures the user's attention, and can be quite a marketing edge. Take, for example, the Pez™ candy dispensers. The user flips back a cap which is usually a figure head, and out comes a Pez candy. Sweet!

Embodiment 3

FIGS. 3, 3A, 3B and 3C illustrate another embodiment 300 of the invention. This embodiment does not incorporate a "reverse motion" feature, and only partially encloses the USB stick in the "closed" position. However, it is "retractable", as are the previously-described embodiments. FIG. 3 is a perspective view. FIGS. 3A, 3B and 3C are side cross-sectional views corresponding to FIGS. 2A, 2B and 2C in that they show the apparatus 300 in "closed", "opening" and "open" positions, respectively.

The apparatus 300 comprises three main components:
  an inner USB stick 310 (compare USB sticks 110, 210);
  an outer holder 320 (compare holder 120, 220); and
  an intermediate support 330 (compare strap 130, 330).

Referring to FIG. 3, the USB stick 310 comprises an elongate main body 312 (compare 112, 212) and a USB connector 314 (compare 114, 214) at its front end of the main body 312.

The outer holder 320 comprises an elongate housing 322 with an opening 324 at its front end (bottom right, as viewed). The housing 322 is suitably generally in the form of a cylinder, open at one end. The back end (top right, as viewed) end of the housing 322 is closed, and is shown with a tip or point ("tip") of a ball point pen ink cartridge (other than the tip, not visible) sticking out. This embodiment is intended to resemble a ball point pen. Functionally, it could be made to work like a ball point pen so that by twisting the barrel the pen stylus would come out.

The intermediate support 330 is essentially two parallel, substantially equal length, elongate arms 332 and 334 extending from within the "barrel" (cylindrical housing 322) of the "pen" (outer holder 320) to external of the barrel. FIG. 3 shows the apparatus 300 in an "opening" position (see also FIG. 3B).

The "nifty" mechanism in this embodiment is not a reverse motion mechanism, as in the previous embodiments. The USB stick 210 is pivotally supported between end portions of the two arms 332 and 334, such as by trunnions extending from opposite sides of the main body 314 to corresponding trunnion-receiving holes in the arms 332 and 334. ("Trunnion"—A pin or gudgeon, especially either of two small cylindrical projections on a cannon forming an axis on which it pivots.) In this manner, the USB stick 310 is pivotable, as indicated by the two-headed arrow in FIG. 3.

The arms 332 and 334 can move longitudinally within and without of the pen barrel (320), each being guided along track recesses. In FIG. 3, one track recess 336 is visible. A hoop, or band 338 circumscribes the front end (lower left) of the pen barrel 320 to keep the arms 332 and 334 in sliding engagement with the track recesses in the external surface of the housing 322.

FIG. 3A shows the apparatus 300 in a "closed" position. The USB stick 310 is oriented with the connector 314 (dashed lines) inside the pen barrel 320.

FIG. 3B shows the apparatus 300 in an "opening" position (compare FIG. 3). The user pulls on the body 312 of the USB stick to withdraw it from the pen barrel 320. The arms 332 and 334 slide in the tracks 336 (and not visible), as indicated by the arrow 350 (compare 150, 250). Then the user commences pivoting the USB stick 180 degrees—see the arrow 351—and the USB stick is illustrated having been pivoted approximately 60 degrees (less than 90 degrees) in this figure.

The user continues to pivot the USB stick, and in its 180 degree rotated position, detents (optional) on the inner surfaces of the arm(s) and outer surface(s) of the USB stick main body may releasably retain the USB stick in its "ready-to-use" position. One of ordinary skill in the art will readily understand how to implement such "detenting" without any further detailed description.

FIG. 3C shows the apparatus 300 in an "open" position. Here, the USB stick 310 is already in its 180-degree rotated, ready-to-use position, with the USB connector 314 forward (right, as viewed). And, what the user has done here is push the USB stick slightly back into the pen housing 320, as indicated by the arrow 352, seating the end of the main body 314 in a slight recess (dashed lines) in the end of the pen housing 320, to keep the USB stick from further pivoting when the user is grasping the pen barrel 320 and inserting the apparatus into a USB port of a personal computer (or the like). (The overall length L of the main body 314 of the USB stick is indicated by the arrow "L", and FIGS. 3A, 3B and 3C are all substantially "to scale" with one another. FIG. 3 is clearly drawn to a different scale.)

It can thus be seen that, although this embodiment does not have a mechanism (e.g., FIG. 1 strap around a boss, FIG. 2 toothed wheel), per se, for imparting reverse motion, in this case the user imparts a type of "reverse motion" (352) manually, directly handling the USB stick 310. In the previous embodiments (e.g., FIG. 1 strap around a boss, FIG. 2 toothed wheel), the user never had to actually touch the USB stick 110, 210, per se. All three embodiments described herein have their own mechanical "niftiness", which certainly can enhance consumer appeal. As alluded to above, all other things being equal, which is more fun, Lifesavers™ or Pez™?

Additional Variations and Embodiments

The Reverse Motion Mechanism can be extended beyond the standard USB key format to the "clam shell" card in ISO format. For wireless communication, the U-shaped antenna could bend horizontally by 90 degrees.

The apparatus casing/housing is normally an injection molded coated plastic material, but other materials include metal (etched & engraved), embossed colored leather, rubber, polished wood, glass (laser engraved), bone and rock.

The physical design can be:
a wooden housing, creating a sleek and elegant gadget by incorporating the reverse motion function and the unique Lamy pico pen mechanism (see Worldwide Web at lamy.com)
a metal (e.g., bronze) housing with embossed characters
a leather housing—providing a "cowboy" look with embossing The physical shape of the portable apparatus is normally that of a fob, but derivations in the design include, a pocket watch (round in shape with similar dimensions), a miniature perfume bottle, a laser pointer, a fountain pen, a key ring, a highlighter, a lipstick balm, a credit card, a pen knife, a cigarette lighter, a whistle, a LED flash light, a ball point pen with PDA stylus, a memo recorder, a talisman, a name plate, a money clip, a key chain with strap & medallion, etc.

To cover or protect the USB connector (e.g., 114, 214), a removable cap can be used, however such caps are easily lost or forgotten. To avoid this problem, a swivel Π-shaped metal cap can be pivoted on one or both sides of the apparatus. In other words, the swivel cap with pivot notches is mounted on or bolted to the top of the apparatus, just below the base of the USB connector. The dimensions of the cap to cover the protruding USB connector with an approximate length of 12 mm, can be L 22 mm×W 12 mm×2 mm. The cap swivels sufficiently to the right or left, almost touching the side of the apparatus, in order to provide clearance for insertion of the apparatus into a host computer or docking station.

The swivel cap may be made of metal to give weight to the apparatus. The USB symbol can be engraved on one or both sides of the swivel cap, to indicate the functionality of the apparatus. A notch on top of the cap, allows the user to wear the apparatus with a necklace. The apparatus housing can be of Plexiglas or any colored transparent material.

To unfold the USB connector, the swivel cap can be swung from right to left and visa verse, with a lock stop position in the middle. The cap cannot be removed as it is bolted, pivoted with a notch and grove, mounted on an axis or it swivels on ball bearings. The shape of the apparatus may be similar to a miniature perfume bottle. See Worldwide Web at dunhill.com, Perfume Product Range: X-centric & Desire Blue In another mechanical configuration, the cap is hinged on one side of the apparatus. The cap can be removed from the USB connector by leveraging the cap upwards. As the cap is mechanically hinged, it cannot be lost. Alternatively, the cap can be fixed to a strap attached to the neck of the apparatus. See Worldwide Web at hugo.com.

The reverse motion concept provides insight into a method to cover and protect the USB connector. In expanding on the idea, it is also feasible to have different connectors (USB & FireWire) integrated into the apparatus. This means that the inputs to the apparatus can be inter-changeable by pushing the reverse motion slide from its middle position to the right or left.

In another mechanical configuration, the apparatus can be integrated into a round medallion, hanging from a leather strap attached to a key ring. The medallion can have a turn dial with groves along its circumference, and a push button lock in the middle. When the dial is turned, the USB connector emerges and locks in place. To unlock the USB connector, the button has to be actuated.

An alternative mechanical construction of the apparatus, protecting the USB connector and preventing the loss of the cap is the idea of a cap with two protruding arms attached, pivoted or bolted to the middle position of the apparatus on a slide/track mechanism. The user simply pulls the cap with arms along the parallel slides and rotates the cap with arms 180 degrees around the middle position, to place the cap on the bottom of the apparatus. The advantage of such a construction is the ability to produce a slim line product with minimal interference with other USB devices at the ports of the host computer.

Based on the same principle, two protective covers on each side of the apparatus can be pivoted from the bottom, and in a similar procedure to opening up a collapsible knife or scissors, the two half covers meet to form the grip or handle on one end and the USB connector emerges at the other end.

The invention has been illustrated and described in a manner that should be considered as exemplary rather than restrictive in character—it being understood that only preferred embodiments have been shown and described, and that all changes and modifications that come within the spirit of the invention are desired to be protected. Undoubtedly, many other "variations" on the techniques set forth hereinabove will occur to one having ordinary skill in the art to which the present invention most nearly pertains, and such variations are intended to be within the scope of the invention, as disclosed herein.

What is claimed is:

1. Retractable USB stick comprising:
   an elongate housing having an open end;
   a USB stick disposed within the elongate housing; and
   means for causing the USB stick to project at least partially out of the open end of the housing in an open position;
   wherein the means for causing the USB stick to project at least partially out of the open end of the housing comprises:
   an outer holder comprising an elongate housing with an opening at one end;
   an intermediate sleeve disposed between the USB stick and the holder; and
   means for imparting reverse motion such that moving the outer housing relative to the intermediate sleeve causes the USB stick to extend from and retract into the intermediate sleeve.

2. The retractable USB stick of claim 1, wherein the means for causing the USB stick to project at least partially out of the open end of the housing causes the USB stick to project substantially fully out of the housing.

3. The retractable USB stick of claim 1, wherein the means for causing the USB stick to project at least partially out of the open end of the housing causes the USB stick to project sufficiently out of the housing so that a USB connector at an end of the USB stick is adequately exposed for plugging into a personal computer.

4. The retractable USB stick of claim 1, further comprising:
   means for releasably locking the USB stick in the open position.

5. The retractable USB stick of claim 1, further comprising: means for closing the open end of the housing.

6. The retractable USB stick of claim 1, wherein the means for causing the USB stick to project at least partially out of the open end of the housing is patterned after comparable means in a lipstick dispenser mechanism of U.S. Pat. No. 3,941,489.

7. The retractable USB stick of claim 1, wherein the means for imparting reverse motion comprises:
   a toothed wheel disposed at a back end of the intermediate sleeve;
   teeth on an inner surface of the outer holder; and
   teeth on an elongate linear track extending from the back end of the USB stick.

8. The retractable USB stick of claim 1, further comprising: an antenna.

9. The retractable USB stick of claim 4, further comprising:
   the antenna is incorporated into the means for causing the USB stick to project at least partially out of the open end of the housing.

10. Method of using a USB stick, comprising:
    providing a housing for the USB stick;
    disposing the USB stick within the housing;
    providing a fingerpiece extending through a longitudinal slot in the housing;
    moving the fingerpiece in a reverse direction causes the USB stick to move in a forward direction through an opening in a front end of the housing, to an open position; and
    moving the fingerpiece in the forward direction causes the USB stick to move in the reverse direction through the opening in a front end of the housing.

11. The method of claim 10, further comprising:
    providing means for releasably locking the USB stick in the open position.

12. The method of claim 10, further comprising:
    providing means for closing the opening in the front end of the housing.

13. Retractable USB stick comprising:
    an elongate housing having a front end;
    a USB stick disposed within the elongate housing; and
    means for causing the USB stick to project at least partially out of an opening at the front end of the housing in an open position;
    wherein the means for causing the USB stick to project at least partially out of the opening comprises:
    an elongate strap extends from a back end of a main body of the USB stick, towards a back end of the housing, wraps around a fixed boss a disposed near the back end of the housing, then extends back towards the front end housing, passing alongside of the USB stick, to the front end of the housing; and
    the means for imparting reverse motion comprises a fingerpiece extending from the strap though a slot in the housing such that moving the fingerpiece relative to the outer housing causes the USB stick to extend from and retract into the housing.

14. The retractable USB stick of claim 13, further comprising:
    means for closing the opening at the front end of the elongate housing in a closed position.

15. The retractable USB stick of claim 14, wherein the means for closing the opening comprises:
    a flap extends from an opposite end of the strap, across the opening, and is sized and shaped to cover the opening in the closed position.

16. The retractable USB stick of claim 13, wherein the means for closing the opening comprises:
    two resilient flaps fixed to opposite sides of the opening and facing each other, which would deflect when the USB stick is extended out of the housing and which return when the USB stick is retracted to within the housing.

17. The retractable USB stick of claim 13, wherein the means for causing the USB stick to project at least partially out of the open end of the housing causes the USB stick to project sufficiently out of the housing so that a USB connector at an end of the USB stick is adequately exposed for plugging into a personal computer.

18. The retractable USB stick of claim 13, further comprising:
   means for releasably locking the USB stick in the open position.

19. The retractable USB stick of claim 13, further comprising:
   an antenna.

20. The retractable USB stick of claim 19, further comprising:
   the antenna is incorporated into the means for causing the USB stick to project at least partially out of the open end of the housing.

* * * * *